United States Patent
Han et al.

(10) Patent No.: US 11,991,087 B2
(45) Date of Patent: May 21, 2024

(54) ENHANCEMENT OF USER PLANE FLOW CONTROL FOR RETRANSMITTED PACKETS

(71) Applicant: Apple Inc., Cupertino, CA (US)

(72) Inventors: Jaemin Han, Portland, OR (US); Feng Yang, Beijing (CN); Yujian Zhang, Beijing (CN); Alexander Sirotkin, Hod Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/309,159

(22) PCT Filed: Oct. 29, 2019

(86) PCT No.: PCT/US2019/058549
§ 371 (c)(1),
(2) Date: Apr. 30, 2021

(87) PCT Pub. No.: WO2020/092357
PCT Pub. Date: May 7, 2020

(65) Prior Publication Data
US 2021/0392085 A1    Dec. 16, 2021

Related U.S. Application Data

(60) Provisional application No. 62/754,401, filed on Nov. 1, 2018.

(51) Int. Cl.
*H04L 47/34* (2022.01)
*H04L 1/1607* (2023.01)

(52) U.S. Cl.
CPC ............ *H04L 47/34* (2013.01); *H04L 1/1642* (2013.01)

(58) Field of Classification Search
CPC .. H04L 47/34; H04L 1/1642; H04W 28/0236; H04W 80/02
See application file for complete search history.

(56) References Cited

U.S. PATENT DOCUMENTS

| | | | | |
|---|---|---|---|---|
| 2017/0135023 | A1* | 5/2017 | Jung | H04W 40/12 |
| 2018/0206173 | A1* | 7/2018 | Virtej | H04W 40/02 |

(Continued)

FOREIGN PATENT DOCUMENTS

| | | | | |
|---|---|---|---|---|
| GB | 2574876 A | * | 12/2019 | H04L 47/10 |
| KR | 10-2017-0095918 | | 8/2017 | |
| WO | 2018/164469 | | 9/2018 | |

OTHER PUBLICATIONS

NEC, "Summary of CB: #27_UP_Retransmission_status", R3-186123, 3GPP TSG-RAN, Oct. 15, 2018.

(Continued)

*Primary Examiner* — Redentor Pasia
(74) *Attorney, Agent, or Firm* — Fay Kaplun & Marcin, LLP (57) ABSTRACT

An apparatus of a next generation Node B (gNB) Distributed Unit (DU) comprises one or more baseband processors to transmit one or more retransmitted Packet Data Convergence Protocol (PDCP) Protocol Data Units (PDUs) received from a gNB Central Unit (CU) to a user equipment (UE), and to feed back not only a latest, in-sequence New Radio User-plane (NR-U) Sequence Number (SN) to the CU for Release 15, but also a highest, in-sequence successfully delivered/transmitted PDCP SN, optionally, with a NR-U SN up to which the reported PDCP SN should be applied, which can provide an exact range of successfully delivered/transmitted status for retransmitted packets even in case of DU's re-ordering based on PDCP SN before transmitting to (Continued)

the UE. The apparatus can include a memory to store the reported PDCP SN and NR-U SN.

12 Claims, 6 Drawing Sheets

(56) References Cited

U.S. PATENT DOCUMENTS

| | | | | |
|---|---|---|---|---|
| 2019/0098544 A1* | 3/2019 | Han | ................. | H04W 36/30 |
| 2019/0150224 A1* | 5/2019 | Han | ................. | H04W 92/12 |
| | | | | 370/329 |
| 2019/0166641 A1* | 5/2019 | Kim | ................. | H04L 1/00 |
| 2019/0229864 A1* | 7/2019 | Kim | ................. | H04L 47/34 |
| 2019/0246310 A1* | 8/2019 | Han | ................. | H04W 28/0263 |
| 2019/0281517 A1* | 9/2019 | Oak | ................. | H04W 36/0055 |
| 2020/0084682 A1* | 3/2020 | Wang | ................. | H04W 92/20 |
| 2020/0228245 A1* | 7/2020 | Shi | ................. | H04L 1/1874 |
| 2021/0144585 A1* | 5/2021 | Toeda | ................. | H04W 28/08 |
| 2021/0211939 A1* | 7/2021 | Teyeb | ................. | H04L 47/12 |
| 2021/0235291 A1* | 7/2021 | Byun | ................. | H04W 28/0236 |
| 2021/0242971 A1* | 8/2021 | Liu | ................. | H04L 1/1864 |
| 2021/0314809 A1* | 10/2021 | Teyeb | ................. | H04W 76/12 |
| 2021/0385027 A1* | 12/2021 | Skarve | ................. | H04L 1/1874 |

OTHER PUBLICATIONS

Samsung, "Clarification on highest NR PDCP PDU SN for retransmitted PDCP PDU", R3-186018, 3GPP TSG-RAN, Sep. 29, 2018.
Nokia et al., "Downlink Data Delivery Status Reporting", R3-185634, 3GPP TSG-RAN, Sep. 28, 2018.

* cited by examiner

ENHANCEMENT OF USER PLANE FLOW CONTROL FOR RETRANSMITTED PACKETS

CROSS-REFERENCE TO RELATED APPLICATIONS

The present application claims the benefit of U.S. Provisional Application No. 62/754,401 (AB6640-Z) filed Nov. 1, 2018. Said Application No. 62/754,401 is hereby incorporated herein by reference in its entirety.

BACKGROUND

New Radio (NR) user-plane flow control as specified in the Third Generation Partnership Project (3GPP) Technical Standard (TS) 38.425 has been enhanced to incorporate diverse use cases. One example is to support a split bearer with retransmission, that is when the Central Unit (CU) in the case of split between the CU and the Distributed Unit (DU), or the node hosting Packet Data Convergence Protocol (PDCP) entity in case of Downlink Control (DC) decides to retransmit downlink (DL) PDCP protocol data unit (PDUs) not delivered on one leg via another leg. The CU can flag the DL User Data Frame if a carried PDCP PDU is a retransmitted packet so that the DU or the assisting node is aware and can prioritize those retransmitted packets to minimize service interruption.

Those retransmitted PDCP PDUs may arrive at the DU out-of-sequence, as the CU can retransmit whatever reported to be missing. It is possible that the CU retransmits PDCP PDUs with Sequence Number (SN) #103, #104, which were tried in other leg, to a DU, then with SN #95, #96, #97, which were reported lost on the way to this DU via DL Data Deliver Status (DDDS), again to the same DU.

Currently, the DU feedbacks highest in-sequence PDCP SN, among received, for those retransmitted PDCP PDUs. The intention is to clean-up successfully delivered PDCP PDUs in the CU's buffer, however, such "highest in-sequence" feedback could adversely affect the user equipment (UE). Continuing from the above example, if SN #103 and #104 are already delivered to the UE but the DU still doesn't receive SN #95, #96, #97 yet, then at this time the highest in-sequence will be #104. If reported via DDDS, then this can mislead the CU to think that all SN #95, #96, #97, #103, #104 have been successfully delivered to the UE.

Specifically, as long as there is a retransmitted PDCP PDU transferred to the DU with a SN lower than the one reported by DU, "highest in-sequence" feedback can mislead the CU to think that those retransmitted PDCP PDUs with lower SN than reported are successfully delivered to the UE, regardless of whether they are arriving later or lost in the middle. Especially, "lost in the middle" that the CU thinks are successfully delivered and thus erased from its buffer but which the DU didn't receive at all could result in a gap in the UE's PDCP reordering window, which cannot be rescued via PDCP status report, and thus PDCP Hyper Frame Number (HFN) de-synchronization can occur. Therefore, given that the CU may send PDCP PDUs with retransmission flags in an out-of-order fashion, some enhancements can be provided in DDDS to address the above ambiguity.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise"

and "include," along with their derivatives, may be used and are intended as synonyms for each other.

Figure 1A:
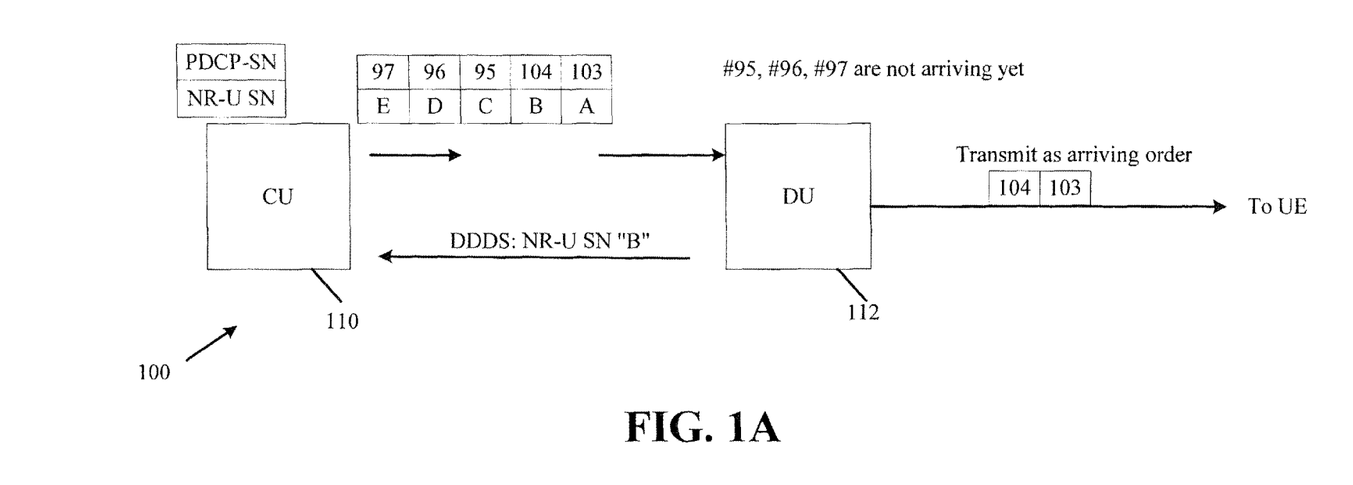
FIGS. 1A-1B are diagrams showing where the Distributed Unite (DU) or assisting node feedbacks a latest, in-sequence New Radio User-plane (NR-U) Sequence Number (SN) in accordance with one or more embodiments.
Figure 1B:
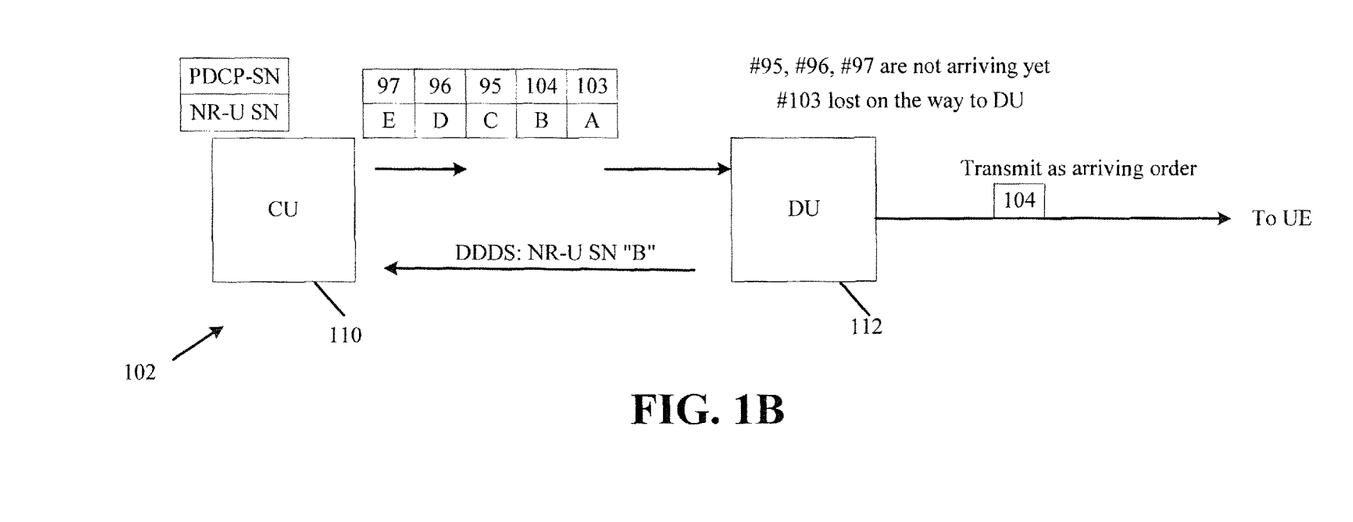

Referring now to FIGS. 1A-1B, diagrams showing where the distributed unit (DU) or assisting node feedbacks a latest, in-sequence New Radio User-plane (NR-U) sequence Number (SN) in accordance with one or more embodiments will be discussed. The embodiments described herein can provide several mechanisms to resolve the current ambiguity when the DU, or assisting node, provides feedbacks for the PDCP PDUs with retransmission flags which could adversely affect the user equipment (UE). It should be noted that for any retransmitted packet, the Central Unit (CU) or node hosting Packet Data Convergence Protocol (PDCP) entity can set a "retransmission flag" in the downlink (DL) User Data Frame, meaning that the DL User Data Frame is always invoked whenever the CU sends a retransmitted PDCP PDU to the DU or assisting node, for example as highlighted via underlining in Table 1 below.

TABLE 1

Retransmission flag for Downlink User Data Frame

| Bits | | | | | | | | Number Of Octets |
|---|---|---|---|---|---|---|---|---|
| 7 | 6 | 5 | 4 | 3 | 2 | 1 | 0 | |
| PDU Type (=0) | | | | Spare | DL Discard Blocks | DL Flush | Report Polling | 1 |
| Spare | | | | Report Delivered | User data existence flag | Assistance Info. Report Polling Flag | Retransmission flag | 1 |
| NR-U Sequence Number | | | | | | | | 3 |
| DL discard NR PDCP PDU SN | | | | | | | | 0 or 3 |
| DL discard Number of blocks | | | | | | | | 0 or 1 |
| DL discard NR PDCP PDU SN start (first block) | | | | | | | | 0 or 3 |
| Discarded Block size (first block) | | | | | | | | 0 or 1 |
| . . . | | | | | | | | |
| DL discard NR PDCP PDU SN start (last block) | | | | | | | | 0 or 3 |
| Discarded Block size (last block) | | | | | | | | 0 or 1 |
| DL report NR PDCP PDU SN | | | | | | | | 0 or 3 |
| Padding | | | | | | | | 0-3 |

There is a NR-U Sequence Number (SN), different from a PDCP SN, which is assigned consecutively whenever the DL User Data Frame is invoked, meaning that each retransmitted PDCP PDU transferred to the DU or assisting node is associated with the corresponding NR-U SN in an increasing order. In accordance with a first embodiment, at diagram 100 of FIG. 1A, the DU 112 or assisting node can feedback the "latest, in-sequence" NR-U SN among received. This solution approach as shown in FIG. 1A addresses the above example case when the CU sends SNs with #103, #104, #95, #96, #97 in-order, but the DU has not received #95, #96, #97 yet while #103, #104 are already delivered to the UE. If we say the associated NR-U SN for those retransmitted packets are A, B, C, D, E, respectively, then DU can feedback "B" instead of PDCP SN #104, making the CU to correctly assume that only up to #104 are delivered to the UE.

Referring to diagram 102 of FIG. 1B, supposing that #103 was lost in the middle on the way to the DU 112, the DU 112 will report "B" as the associated PDCP PDU #104 being the only one received from the CU 110 and delivered to the UE until it feedbacks. This report of NR-U SN "B", however, can make the CU 110 think that the lost #103 was also successfully delivered to the UE.

Figure 2A:
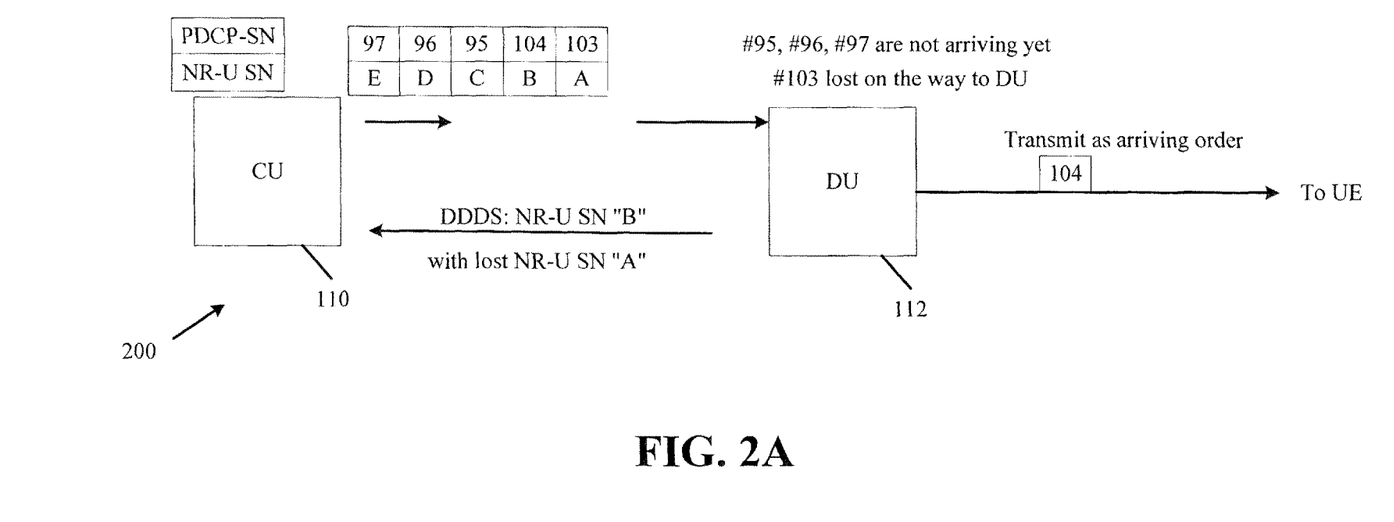
FIGS. 2A-2B are diagrams showing where the DU or assisting node feedbacks a latest, in-sequence NR-U SN among received with a lost NR-U SN report in accordance with one or more embodiments.
Figure 2B:
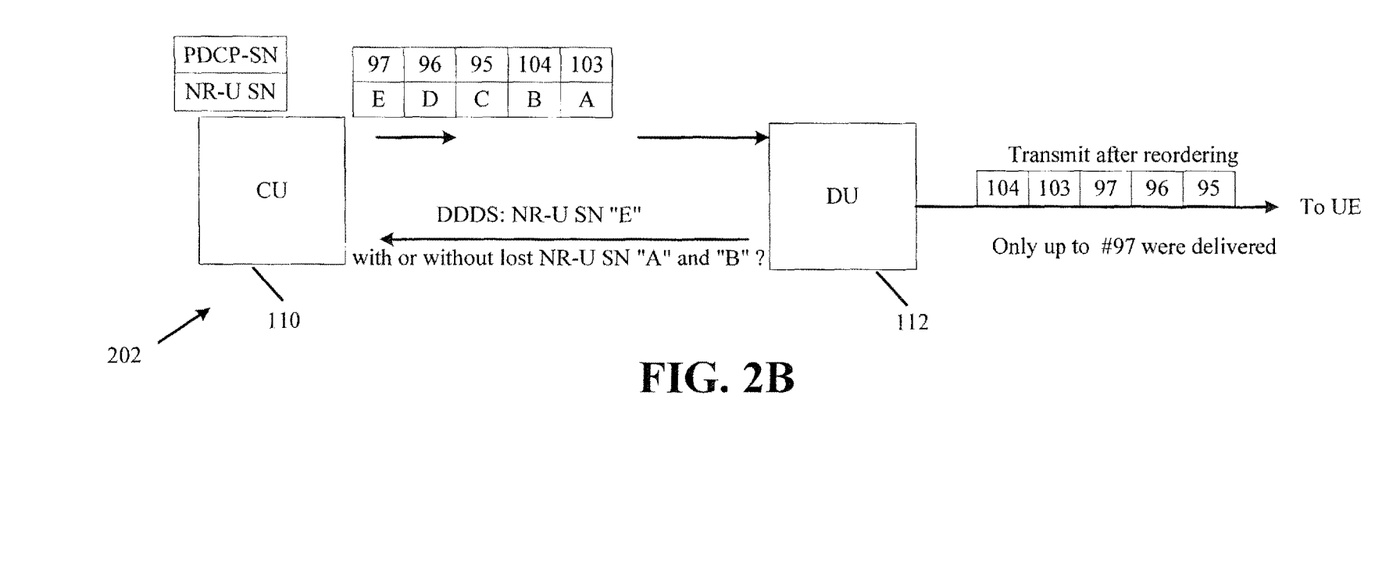

Referring now to FIGS. 2A-2B, diagrams showing where the DU or assisting node feedbacks a latest, in-sequence NR-U SN among received with a lost NR-U SN report in accordance with one or more embodiments will be discussed. In this embodiment, the DU 112 feeds back "latest, in-sequence" NR-U SN among received with a lost NR-U SN report.

As shown with diagram 200 of FIG. 2A, in a second embodiment the above loophole of the first embodiment can be avoided if the DU 112 reports lost NR-U SN together. If NR-U SN "A" is reported missing when "B" is fed back, then the CU 110 is able to know that the associated PDCP PDU with SN #103 was lost while #104 was successfully delivered to the UE.

The approach of diagram 200, however, does not cover all cases. Suppose that all #103, #104, #95, #96, #97 are successfully transferred to the DU 112 while the DU 112 decides to prioritize based on PDCP SN, that is transmitting in the order of #95 (C), #96 (D), #97 (E), #103 (A), #104 (B). Suppose that up to #97 were successfully delivered to the UE. As shown in diagram 202 of FIG. 2B, the NR-U SN "E" is associated with #97, but if "E" is reported alone, then the CU 110 will think that all those five packet are successfully delivered to the UE. The DU 112 needs to say somehow #103 (A) and #104 (B) are still pending, but if reported via the lost NR-U report, then CU 110 would think that it needs to retransmit #103 and #104 again. If the "latest, in-sequence" concept is adhered to, then another NR-U SN report may be required.

Figure 3A:
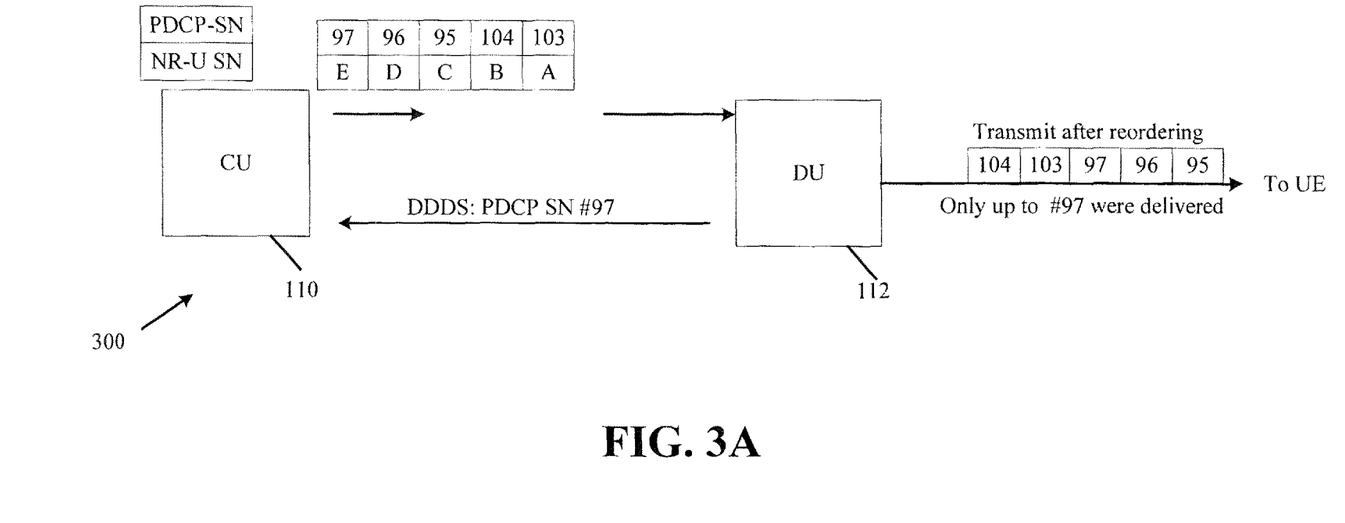
FIGS. 3A-3B are diagrams showing the CU or node hosting PDCP entity interprets a highest, in-sequence PDCP SN feedback only up to the associated NR-U SN in accordance with one or more embodiments.
Figure 3B:
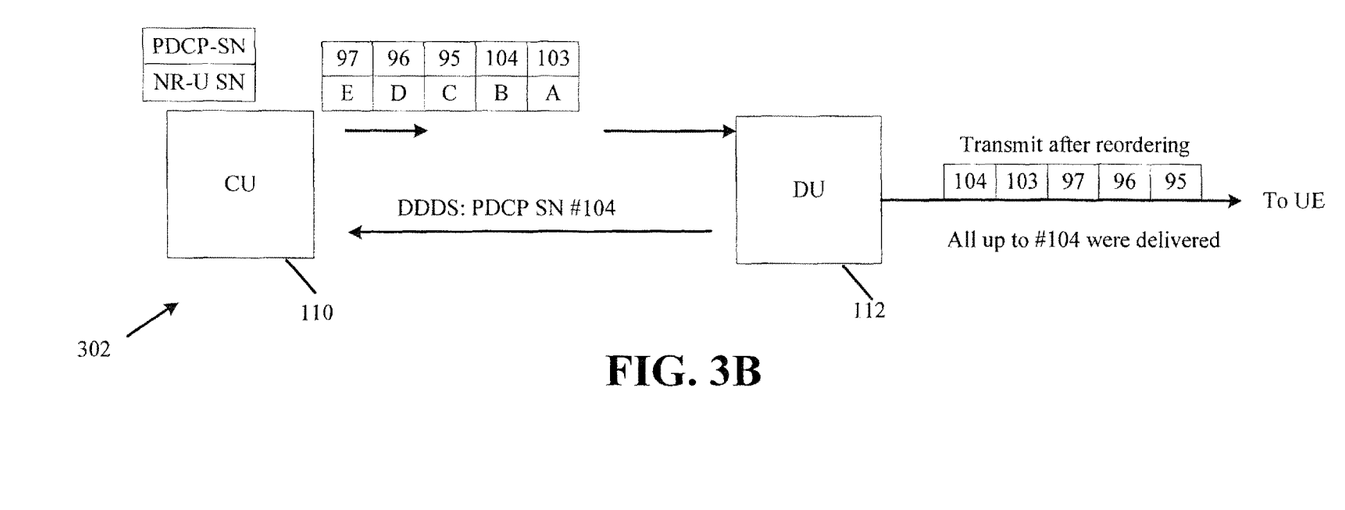

Referring now to FIGS. 3A-3B, diagrams showing the CU or node hosting PDCP entity interprets a highest, in-sequence PDCP SN feedback only up to the associated NR-U SN in accordance with one or more embodiments will be discussed. In a third embodiment, the CU 110 or node hosting PDCP entity interprets the "highest, in-sequence" PDCP SN feedback only up to the associated NR-U SN. The lost NR-U SN report can be used, but only in case there is a lost packet with SN lower than the reported for which whose NR-U SN is assigned earlier than the NR-U SN of the reported PDCP SN. Otherwise, those lost would be considered as successfully delivered.

As shown in diagram 300 of FIG. 3A, the above problem can be avoided if the "highest, in-sequence" concept is used based on PDCP SN, but the CU 110 only applies this up to the associated NR-U SN. For example, if the DU 112 feeds back PDCP SN #97 and the CU 110 applies this up to the associated NR-U SN, which is "E", then the CU 110 can know that up to NR-U SN "E", retransmitted packets with PDCP SN lower than or equal to #97 are successfully delivered, and further can deduce that #103 (A) and #104 (B) are neither lost nor delivered yet.

However, as shown in diagram 302 of FIG. 3B, if the DU 112 reports after successfully delivering up to #104, then the CU 110 will think that retransmitted packets with SN less than or equal to #104 but only up to the associated NR-U SN "B", which are #103 and #104, are successfully delivered. As a result, the CU 110 will think that #95, #96, #97 are undelivered yet.

Figure 4A:
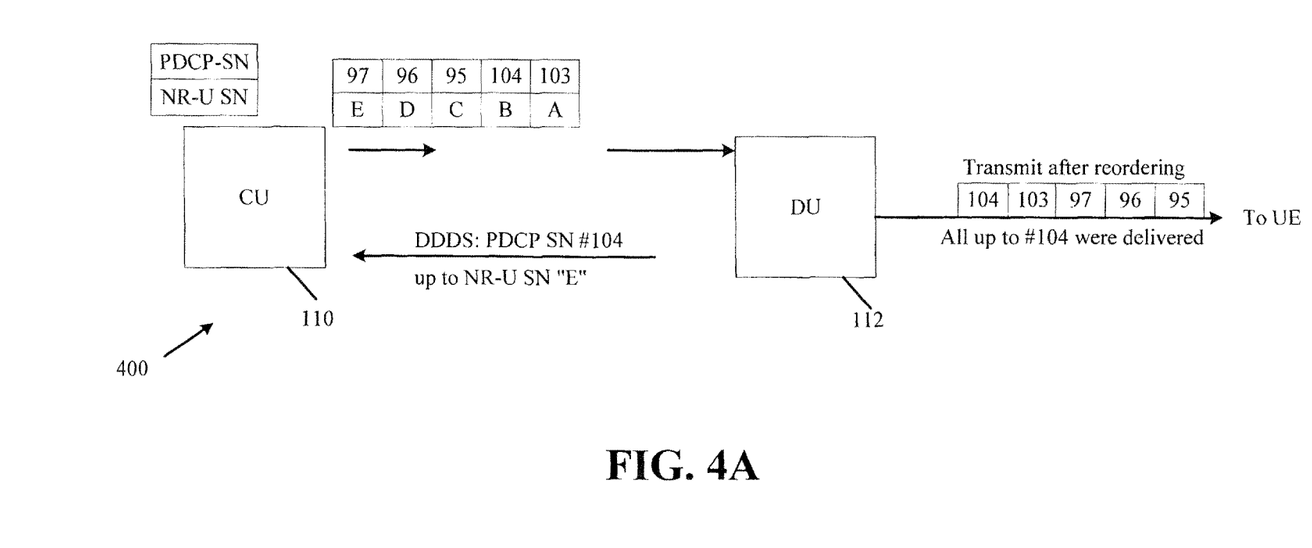
FIGS. 4A-4B are diagrams showing where the DU feedbacks a highest, in-sequence PDCP SN together with an NR-U SN up to which the CU should apply the reported PDCP SN in accordance with one or more embodiments.
Figure 4B:
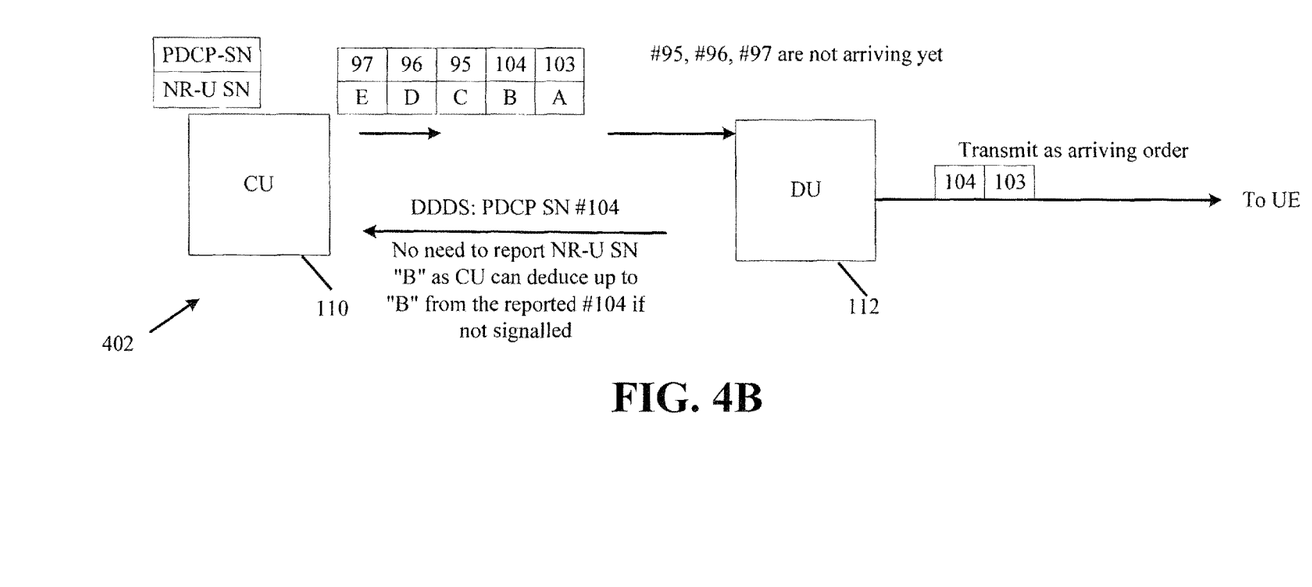

Referring now to FIGS. 4A-4B, diagrams showing where the DU feedbacks a highest, in-sequence PDCP SN together with an NR-U SN up to which the CU should apply the reported PDCP SN in accordance with one or more embodiments will be discussed. In a fourth embodiment, the DU 112 feeds back "highest, in-sequence" PDCP SN together with a "NR-U SN" up to which the CU should apply the reported PDCP SN. The lost NR-U SN report also can be used in case there is a lost packet with SN lower than the reported for which whose NR-U SN is assigned earlier than the reported NR-U SN. Otherwise, those lost would be considered as successfully delivered.

As a result, the problem with the third embodiment, above, can be mitigated using the fourth embodiment as shown in diagram 400 of FIG. 4A where the DU 112 separately indicates the range of packets that the CU 110 should consider when applying the reported "highest, in-sequence" PDCP SN. Namely, the reported NR-U SN defines up to which PDCP PDU that the CU 110 should consider applying the reported "highest, in-sequence" PDCP SN. In this way, together with the lost NR-U SN report, DU is able to exactly tell the packets that it has successfully received and also successfully delivered to the UE which CU 110 can consider when emptying its buffers by the reported PDCP SN.

As shown in diagram 402 of FIG. 4B, such NR-U SN can be defined as optional, because it can be omitted if this NR-U SN is the same as the NR-U SN of the reported "highest, in-sequence" PDCP SN. The example of FIG. 4B can be based on the case in FIG. 1A. The exemplary implementation of the fourth embodiment on DDDS frame defined in FIG. 5.5.2.2-1 of 3GPP TS 38.425 can be as follows in Table 2, below.

TABLE 2

Exemplary implementation on DDDS frame

| 7 | 6 | 5 | 4 | 3 | 2 | 1 | 0 | Number Of Octets |
|---|---|---|---|---|---|---|---|---|
| | | | | Bits | | | | |
| PDU Type (=1) | | | Highest Transmitted NR PDCP SN Ind | Highest Delivered NR PDCP SN Ind | Final Frame Ind. | Lost Packet Report | 1 |
| Spare | | End NR-U SN Range | Data Rate Ind. | Highest Retransmitted NR PDCP SN Ind | Highest Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | |  |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Highest successfully delivered retransmitted NR PDCP Sequence Number | | | | | | | | 0 or 3 |
| End of NR-U Sequence Number range for Highest successfully delivered retransmitted NR PDCP Sequence Number | | | | | | | | 0 or 3 |
| Highest retransmitted NR PDCP Sequence Number | | | | | | | | 0 or 3 |
| Padding | | | | | | | | 0-3 |

In a fifth embodiment, the DU feeds back the "highest, in-sequence" PDCP SN together with applicable NR-U Sequence number ranges reported. The fifth embodiment can be a full-fledged solution that enables the DU 112 to provide full delivery status like PDCP status report or bitmap. For the example of diagram 400 of FIG. 4A, suppose that PDCP-SN #104 and #95 were not delivered to the UE. Then the "highest in-sequence" PDCP SN, namely #103 together with a "NR-U SN" up to E, should work with lost NR-U range reported.

An alternative is to report applicable or inapplicable NR-U sequence number ranges. Taking the applicable NR-U sequence number ranges, the fields of which are as shown in Table 3 below for example, the following should be reported:

Number of applicable NR-U Sequence Number ranges reported=1
Start of applicable NR-U Sequence Number range=D
End of applicable NR-U Sequence Number range=E

TABLE 3

Reported Sequence Number Ranges

| Number of applicable NR-U Sequence Number ranges reported | 0 or 1 |
|---|---|
| Start of applicable NR-U Sequence Number range | 0 or (6* Number of reported applicable NR-U SN ranges) |
| End of applicable NR-U Sequence Number range | |

Figure 5:
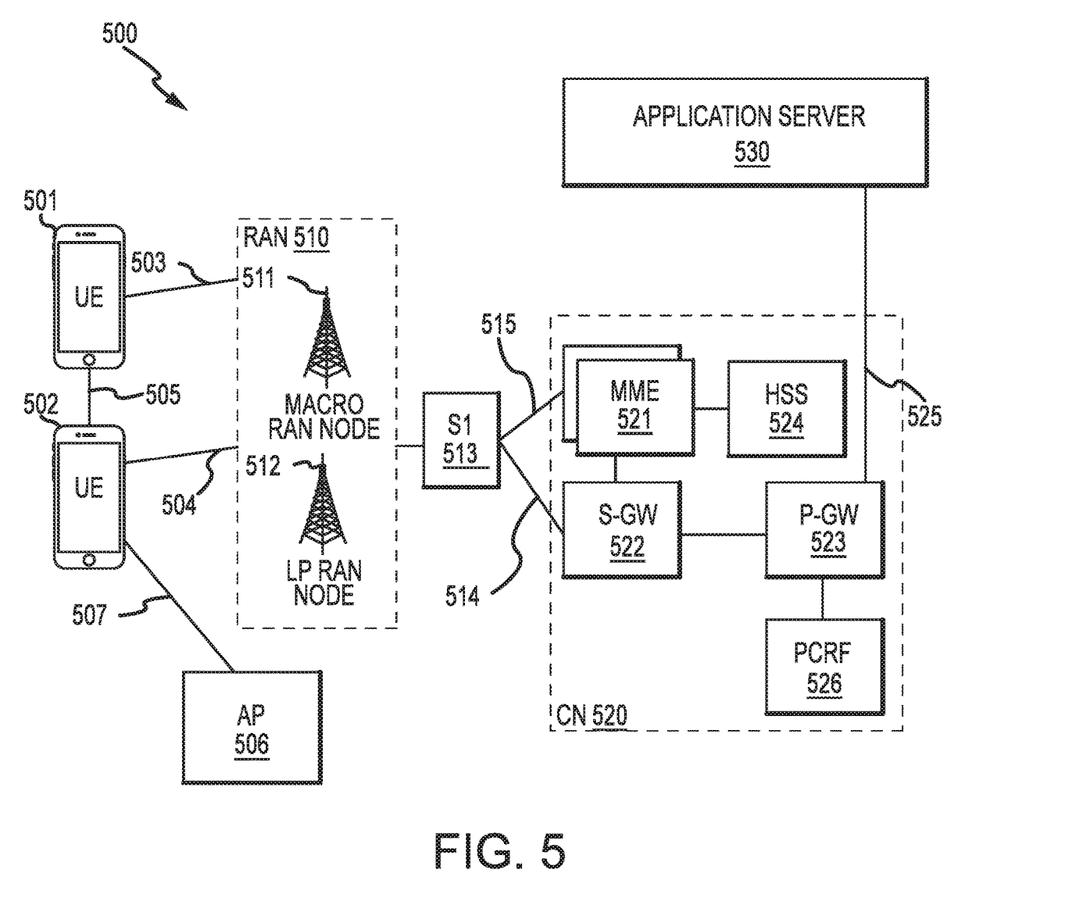
FIG. 5 illustrates an architecture of a system of a network in accordance with some embodiments.

FIG. 5 illustrates an architecture of a system of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
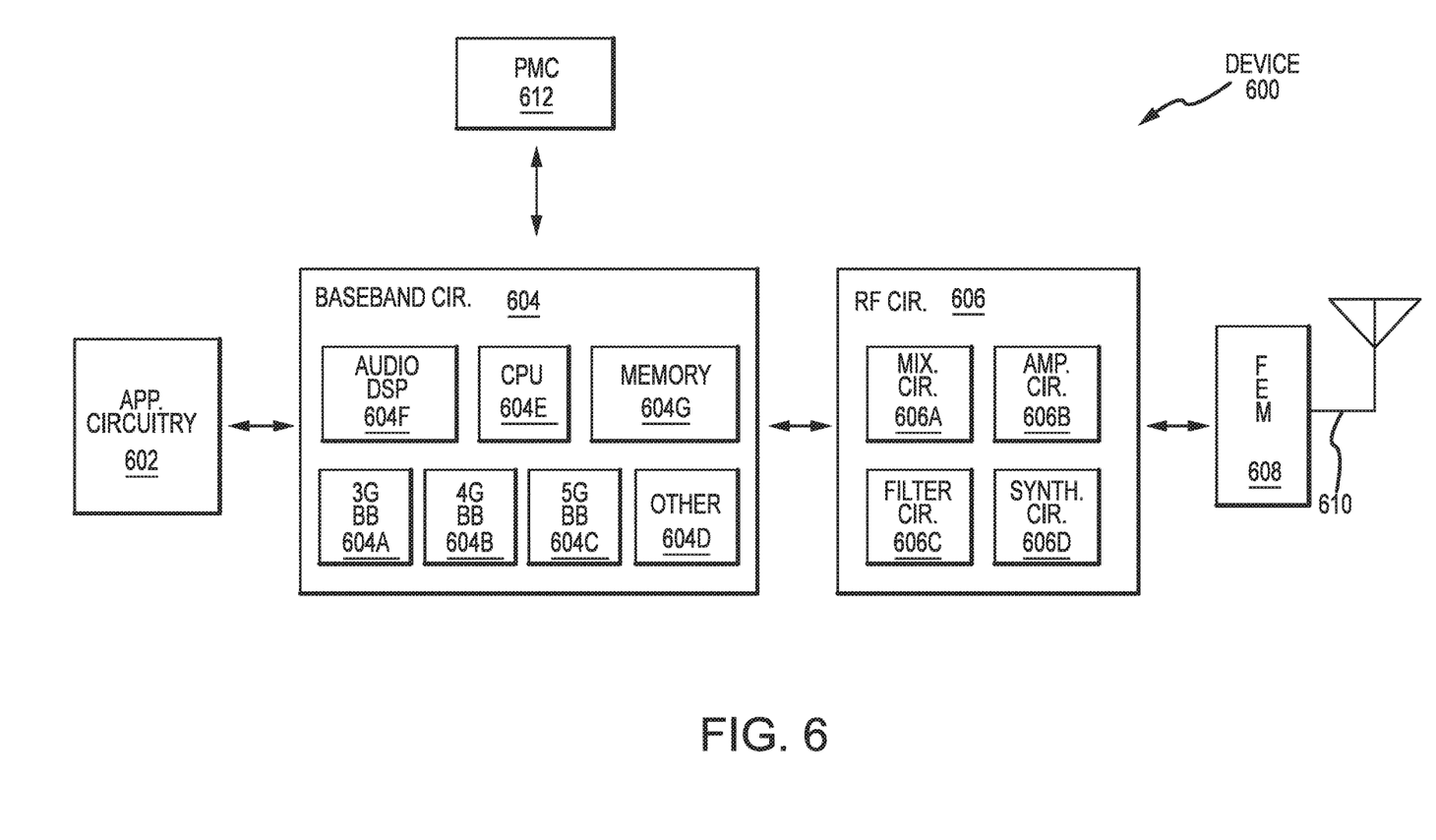
FIG. 6 illustrates example components of a device in accordance with some embodiments.

FIG. 6 illustrates example components of a device in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), preceding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect. In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage-controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. In other embodiments, however, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The following are example implementations of the subject matter described herein. In a first example, an apparatus of a next generation Node B (gNB) Distributed Unit (DU) comprises one or more baseband processors to transmit one or more Packet Data Convergence Protocol (PDCP) Protocol Data Units (PDUs) received from a gNB Central Unit (CU) to a user equipment (UE), and to feed back a latest, in-sequence New Radio User-plane (NR-U) Sequence Number (SN) to the CU. In a second example, an apparatus of a next generation Node B (gNB) Distributed Unit (DU) comprises one or more baseband processors to transmit one or more Packet Data Convergence Protocol (PDCP) Protocol Data Units (PDUs) received from a gNB Central Unit (CU) to a user equipment (UE), and to feed back a highest, in-sequence PDCP Sequence Number (SN) to the CU. In a third example, an apparatus of a next generation Node B (gNB) Central Unit (CU) comprises one or more baseband processors to transmit one or more Packet Data Convergence Protocol (PDCP) Protocol Data Units (PDUs) to a gNB Distributed Unit (DU) to be sent to a user equipment (UE), and to receive a latest, in-sequence New Radio User-plane (NR-U) Sequence Number (SN) as feedback from the DU. In a fourth example, an apparatus of a next generation Node B (gNB) Central Unit (CU) comprises one or more baseband processors to transmit one or more Packet Data Convergence Protocol (PDCP) Protocol Data Units (PDUs) to a gNB Distributed Unit (DU) to be sent to a user equipment (UE), and to receive a highest, in-sequence PDCP Sequence Number (SN) as feedback from the DU. Further examples can be directed to means or a machine-readable storage that can include instructions, when executed, to implement a method or realize an apparatus according to any of the examples herein.

Although the claimed subject matter has been described with a certain degree of particularity, it should be recognized that elements thereof may be altered by persons skilled in the art without departing from the scope of claimed subject matter. The subject matter pertaining to enhancement of user plane flow control for retransmitted packets and many of its attendant utilities will be understood by the forgoing description, and it will be apparent that various changes may be made in the form, construction, or arrangement of the components thereof without departing from the scope of the claimed subject matter or without sacrificing all of its material advantages, the form herein before described being merely an explanatory embodiment thereof, or further without providing substantial change thereto. It is the intention of the claims to encompass or include such changes.

What is claimed is:

1. An apparatus of a next generation Node B (gNB) Distributed Unit (DU), comprising:
   radio frequency circuitry configured to communicate with a user equipment (UE); and
   one or more baseband processors communicatively coupled to the radio frequency circuitry and configured to perform operations comprising:
   receiving a set of Packet Data Convergence Protocol (PDCP) Protocol Data Units (PDUs) from a gNB Central Unit (CU), wherein each PDCP PDU from the set of PDCP PDUs is associated with a PDCP sequence number (SN) and a New Radio User-plane (NR-U) SN, wherein the set of PDCP PDUs are assigned consecutive NR-U SNs;
   transmitting one or more New Radio User-plane (NR-U) packets comprising one or more PDCP PDUs from the set of PDCP PDUs to the UE; and
   feeding back, to the CU, (i) an indication of a highest, received in-sequence PDCP SN (ii) a number of lost NR-U SN ranges, (iii) a start of a lost NR-U SN range and (iv) an end of the lost NR-U SN range, wherein the CU interprets the highest, received in-sequence PDCP SN only up to a corresponding NR-U SN.

2. The apparatus of claim 1, wherein the highest, received in-sequence PDCP SN is fed back with a NR-U SN up to which the fed back PDCP SN should be applied.

3. The apparatus of claim 1, wherein the feeding back further comprises feeding back a successfully delivered retransmitted NR-U SN.

4. An apparatus of a next generation Node B (gNB) Central Unit (CU), comprising:
   radio frequency circuitry configured to communicate with a gNB Distributed Unit (DU); and
   one or more baseband processors communicatively coupled with the radio frequency circuitry and configured to perform operations comprising:
   transmitting a set of Packet Data Convergence Protocol (PDCP) Protocol Data Units (PDUs) to the DU to be sent to a user equipment (UE), wherein each PDCP PDU from the set of PDCP PDUs is associated with a PDCP sequence number (SN) and a New Radio User-plane (NR-U) SN, wherein the set of PDCP PDUs are assigned consecutive NR-U SNs; and
   receiving, from the DU, (i) a highest, received in-sequence PDCP SN, (ii) a number of lost New Radio User-plane (NR-U) SN ranges, (iii) a start of a lost NR-U SN range and (iv) an end of the lost NR-U SN range, wherein the one or more baseband processors interprets the highest, received in-sequence PDCP SN feedback only up to a corresponding NR-U SN.

5. The apparatus of claim 4, wherein the one or more baseband processors are to receive the highest, received in-sequence PDCP SN with an NR-U SN up to which the fed back PDCP SN should be applied.

6. The apparatus of claim 4, wherein the receiving further comprises receiving a successfully delivered retransmitted NR-U SN.

7. A method performed by a next generation Node B (gNB) Distributed Unit (DU), comprising:
   receiving a set of Packet Data Convergence Protocol (PDCP) Protocol Data Units (PDUs) from a gNB Central Unit (CU), wherein each PDCP PDU from the set of PDCP PDUs is associated with a PDCP sequence number (SN) and a New Radio User-plane (NR-U) SN, wherein the set of PDCP PDUs are assigned consecutive NR-U SNs;
   transmitting one or more New Radio User-plane (NR-U) packets comprising one or more PDCP PDUs from the set of PDCP PDUs to a user equipment (UE); and
   feeding back, to the CU, (i) a highest, received in-sequence PDCP SN, (ii) a number of lost NR-U SN ranges, (iii) a start of a lost NR-U SN range and (iv) an end of the lost NR-U SN range, wherein the CU interprets the highest, received in-sequence PDCP SN feedback only up to a corresponding NR-U SN.

8. The method of claim 7, wherein the feeding back further comprises feeding back a successfully delivered retransmitted NR-U SN.

9. The method of claim 7, wherein the highest, received in-sequence PDCP SN is fed back with a NR-U SN up to which the fed back PDCP SN should be applied.

10. A method performed by a next generation Node B (gNB) Control Unit (CU), comprising:
    transmitting a set of Packet Data Convergence Protocol (PDCP) Protocol Data Units (PDUs) to a gNB Distributed Unit (DU) to be sent to a user equipment (UE), wherein each PDCP PDU is associated with a PDCP sequence number (SN) and a New Radio User-plane (NR-U) SN, wherein the set of PDCP PDUs are assigned consecutive NR-U SNs; and
    receiving, from the DU, (i) a highest, received in-sequence PDCP SN, (ii) a number of lost New Radio User-plane (NR-U) SN ranges, (iii) a start of a lost NR-U SN range and (iv) an end of the lost NR-U SN range, wherein each NR-U SN corresponds to one of the PDCP SNs, wherein the CU interprets the highest, received in-sequence PDCP SN feedback only up to a corresponding NR-U SN.

11. The method of claim 10, wherein the receiving further comprises receiving a successfully delivered retransmitted NR-U SN.

12. The method of claim 10, wherein the highest, received in-sequence PDCP SN is received with a NR-U SN up to which the fed back PDCP SN should be applied.

\* \* \* \* \*